United States Patent
Loui et al.

(10) Patent No.: US 10,115,033 B2
(45) Date of Patent: Oct. 30, 2018

(54) SYSTEM AND METHOD FOR CREATING NAVIGABLE VIEWS

(71) Applicant: Kodak Alaris Inc., Rochester, NY (US)

(72) Inventors: Alexander C. Loui, Penfield, NY (US); Joseph A. Manico, Rochester, NY (US)

(73) Assignee: Kodak Alaris Inc., Rochester, NY (US)

( * ) Notice: Subject to any disclaimer, the term of this patent is extended or adjusted under 35 U.S.C. 154(b) by 0 days.

(21) Appl. No.: 14/444,353

(22) Filed: Jul. 28, 2014

(65) Prior Publication Data

US 2015/0036931 A1    Feb. 5, 2015

Related U.S. Application Data

(60) Provisional application No. 61/859,935, filed on Jul. 30, 2013, provisional application No. 61/859,941, filed on Jul. 30, 2013.

(51) Int. Cl.
*G06K 9/46* (2006.01)
*G06T 5/00* (2006.01)
(Continued)

(52) U.S. Cl.
CPC ......... *G06K 9/46* (2013.01); *G06F 17/30259* (2013.01); *G06K 9/00677* (2013.01);
(Continued)

(58) Field of Classification Search
None
See application file for complete search history.

(56) References Cited

U.S. PATENT DOCUMENTS 7,158,099 B1   1/2007  Berube et al.
8,150,098 B2   4/2012  Gallagher et al.
(Continued)

FOREIGN PATENT DOCUMENTS

WO    2009155991    12/2009

OTHER PUBLICATIONS

He, Bin, Gang Zhao, and Qifang Liu. "Panoramic video stitching in multi-camera surveillance system." Image and Vision Computing New Zealand (IVCNZ), 2010 25th International Conference of. IEEE, 2010. 6 pages.*

(Continued)

*Primary Examiner* — Ryan P Potts
(74) *Attorney, Agent, or Firm* — Hogan Lovells US LLP

(57) ABSTRACT

A method for creating navigable views includes receiving digital images, computing a set of feature points for each of the digital images, selecting one of the digital images as a reference image, identifying a salient region of interest in the reference image, identifying other digital images containing a region of interest similar to the salient region of interest in the reference image using the set of feature points computed for each of other digital images, designating a reference location for the salient region of interest in the reference image, aligning the other digital images to the image that contains the designated reference location, ordering the image that contains the designated reference location and the other digital images, and generating a navigable view.

22 Claims, 9 Drawing Sheets

(51) Int. Cl.
*G06F 17/30* (2006.01)
*G06K 9/00* (2006.01)

(52) U.S. Cl.
CPC .............. *G06K 9/4671* (2013.01); *G06T 5/00* (2013.01); *G06K 2009/4666* (2013.01)

(56) References Cited

U.S. PATENT DOCUMENTS

| | | | |
|---|---|---|---|
| 8,401,292 B2 | 3/2013 | Park et al. | |
| 2004/0196503 A1 | 10/2004 | Kurtenbach et al. | |
| 2006/0008173 A1 | 1/2006 | Matsugu et al. | |
| 2008/0025646 A1* | 1/2008 | Aguera y Arcas | G06F 17/30277 382/305 |
| 2008/0144943 A1 | 6/2008 | Gokturk et al. | |
| 2008/0232697 A1* | 9/2008 | Chen | G06F 17/30026 382/225 |
| 2008/0232711 A1 | 9/2008 | Prilutsky et al. | |
| 2008/0247600 A1* | 10/2008 | Date | G06F 17/30247 382/103 |
| 2008/0317357 A1 | 12/2008 | Steinberg et al. | |
| 2009/0324127 A1 | 12/2009 | Budagavi | |
| 2010/0302394 A1 | 12/2010 | Srinivasa Rao et al. | |
| 2011/0064311 A1* | 3/2011 | Momosaki | G06K 9/00288 382/190 |
| 2011/0305430 A1* | 12/2011 | Wada | G11B 27/034 386/241 |
| 2011/0316963 A1* | 12/2011 | Li | H04N 7/15 348/14.1 |
| 2012/0154684 A1* | 6/2012 | Luo et al. | 348/700 |
| 2012/0314015 A1* | 12/2012 | Watson | H04N 7/15 348/14.1 |
| 2012/0314247 A1 | 12/2012 | Rogers et al. | |
| 2013/0013578 A1 | 1/2013 | Yang et al. | |
| 2013/0071031 A1* | 3/2013 | Huang et al. | 382/190 |

OTHER PUBLICATIONS

International Search Report dated Nov. 28, 2014 in corresponding PCT application No. PCT/US2014/048355.
David G. Lowe et al., "Distinctive Image Features from Scale-Invariant Keypoints," International Journal of Computer Vision 60(2), 2014, pp. 91-110.
Herbert Bay et al., "SURF: Speeded Up Robust Features," 9th ECCV, 2006.
Krystian Mikolajczyk et al., "A Performance Evaluation of Local Descriptors," IEEE Transactions on Pattern Analysis and Machine Intelligence, vol. 27, No. 10, Oct. 2005, pp. 1615-1630.
Henry Schneiderman et al., "Probabilistic Modeling of Local Appearance and Spatial Relationships for Object Recognition," Proc. of CVPR '98, pp. 45-51.
T.F. Cootes et al., "Active Shape Models—Their Training and Application," Computer Vision and Image Understanding, vol. 61, No. 1, Jan. 1995, pp. 38-59.
Xin Geng et al., "Learning from Facial Aging Patterns for Automatic Age Estimation," ACM Multimedia 2006.
Ming-Hsuan Yang et al., "Support Vector Machines for Visual Gender Classification," IEEE Proc. ICPR, 2000, pp. 1115-1118.
Vladimir Kolmogorov et al., "Multi-camera Scene Reconstruction via Graph Cuts," European Conference on Computer Vision, May 2002.
Nargess Memarsadeghi et al., "A Fast Implementation of the Isodata Clustering Algorithm," International Journal of Computational Geometry & Applications, vol. 17, No. 1, 2007, pp. 71-103.
Office Action dated Feb. 9, 2017, in U.S. Appl. No. 14/314,941.

* cited by examiner

FIG. 5D

SYSTEM AND METHOD FOR CREATING NAVIGABLE VIEWS

CROSS REFERENCE TO RELATED APPLICATIONS

The present application relates to and claims priority from U.S. provisional patent applications entitled METHOD FOR CREATING NAVIGABLE VIEWS, Ser. No. 61/859,935, filed on Jul. 30, 2013 and entitled SYSTEM FOR CREATING NAVIGABLE VIEWS, Ser. No. 61/859,941 filed on Jul. 30, 2013. The disclosures of the above-identified co-pending provisional applications are hereby incorporated by reference in their entirety.

FIELD OF THE INVENTION

The invention relates generally to the field of digital image processing, and in particular to a system and method for creating navigable views and presentations in consumer media collections.

BACKGROUND OF THE INVENTION

The proliferation of digital cameras and smart phones has lead to an explosion of digital images and videos, creating large personal image and video databases. Since taking digital pictures and videos is easy and practically free, consumers no longer restrict picture-taking to important events and special occasions. Images and videos are being captured frequently, and of day-to-day occurrences in the consumers' life. Since a typical user has already accumulated many years of digital images and videos, browsing through the collection to create a slide show or navigable multimedia presentations is a time-consuming process for the consumer.

Digital slide shows compiled from consumer images and video frames including a musical sound track are well known. As with many transitional modalities from analog to digital photography, digital slide shows have failed to enhance the user experience much beyond their analog counterparts, and have not fully utilized the potential of digital processing and media. With the exceptions of digital transitions and music beat derived presentation timing, images are presented in sequence as the sound track plays, as with analog slide shows. Users typically take pictures of people and objects, with the background as a secondary consideration, unless the user is photographing sunsets or landscapes. Since people and objects provide the primary motivation for photography this should also be the primary consideration for presenting the resulting images. Image editing software such as Adobe "After Effects" is used for creating motion graphics and visual effects and allows users to animate, alter and composite media in 2D and 3D space with various built-in tools and third party plug-ins, as well as individual attention to variables like parallax and user-adjustable angle of observation. The problem is that tools like this are very complex to learn and use and require a skilled professional graphic artist. Using extracted objects, people, or a region of interest, theme based "scripts", and guided user selections, multiple choice options, the entire process of creating an animated/navigable multimedia presentation can be automated. This invention provides an automated method to facilitate the tedious process of creating interesting and personalized multimedia presentations and navigable views for a user's image collection.

SUMMARY OF THE INVENTION

In accordance with the present invention, there is provided a system and method for creating navigable views using a plurality of ordered images comprising, receiving a plurality of digital images, using a processor to compute a set of feature points for each of the plurality of digital images, selecting one of the plurality of digital images as a reference image, identifying a salient region of interest in the reference image, using the processor to identify other digital images in the plurality of images containing a region of interest similar to the salient region of interest in the reference image using the set of feature points computed for each of other digital images, designating a reference location for the salient region of interest in the reference image or one of the identified set of similar images, using the processor to align the other digital images to the image that contains the designated reference location, ordering the image that contains the designated reference location and the other digital images, and generating a navigable view displaying the ordered digital images.

Existing consumer image collections can be organized and integrated to create virtual environments. By using computer vision and pattern recognition techniques, presentation and navigation of image collections become an interactive, immersive, non-linear experience as opposed to the conventional "analog-like" digital slide show. This invention aims to facilitate navigable multimedia presentations through the identification of salient recurring region of interest (ROI) or object in a group of digital images. Salient recurring ROI or object is identified by matching keypoints in reference and target images. As a result, redundant, less interesting images could gain value as potential material for creating virtual backgrounds. This is compatible with existing image collections, i.e., no preparation or special capture requirements are required. In addition, recurring stationary objects can be used as hyperlinks to additional information or navigation points. The user can independently select backgrounds and objects to create scenes that are suitable for printing and sharing.

BRIEF DESCRIPTION OF THE DRAWINGS

FIG. 5D shows images with the same person ordered by time according to an embodiment of the present invention.

DETAILED DESCRIPTION OF THE INVENTION

The present invention can be implemented in computer systems as will be well known to those skilled in the art. In the following description, some embodiments of the present invention will be described as software programs. Those skilled in the art will readily recognize that the equivalent of such a method may also be constructed as hardware or software within the scope of the invention.

Because image manipulation algorithms and systems are well known, the present description will be directed in particular to algorithms and systems forming part of, or cooperating more directly with, the method in accordance with the present invention. Other aspects of such algorithms and systems, and hardware or software for producing and otherwise processing the image signals involved therewith, not specifically shown or described herein can be selected from such systems, algorithms, components, and elements known in the art. Given the description as set forth in the following specification, all software implementation thereof is conventional and within the ordinary skill in such arts.

Videos in a collection are included in the term "images" in the rest of the description.

Figure 1:
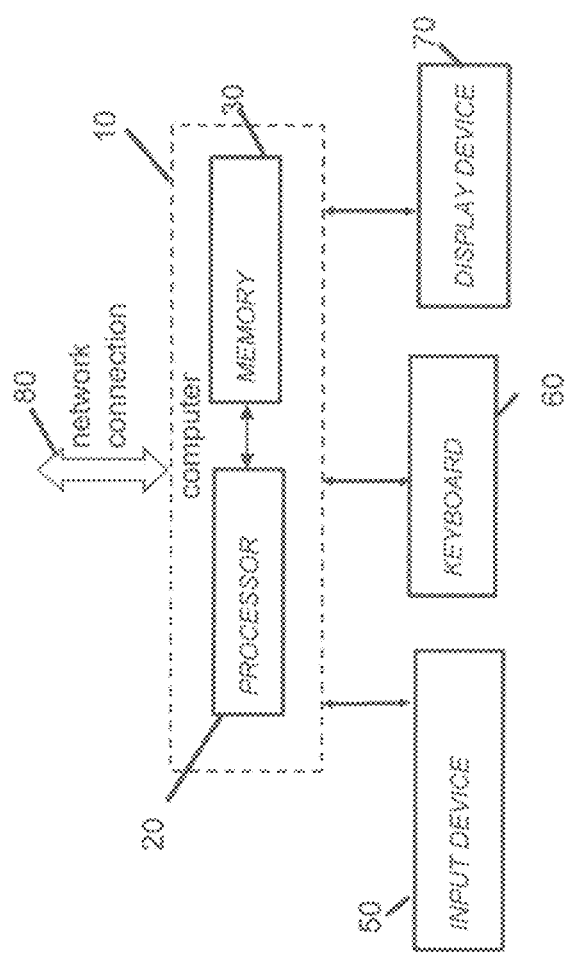
FIG. 1 shows a block diagram of a system according to an embodiment of the present invention.

The present invention can be implemented in computer hardware and computerized equipment. For example, the method can be performed in a digital camera, a multimedia smart phone, a digital printer, on an internet server, on a kiosk, and on a personal computer. Referring to FIG. 1, there is illustrated a computer system for implementing the present invention. Although the computer system is shown for the purpose of illustrating a an embodiment according to the present invention, the present invention is not limited to the computer system shown, but can be used on any electronic processing system such as found in digital cameras, home computers, kiosks, or any other system for the processing of digital images. The computer 10 includes a microprocessor-based unit 20 (also referred to herein as a processor) for receiving and processing software programs and for performing other processing functions. A memory unit 30 stores user-supplied and computer-generated data which may be accessed by the processor 20 when running a computer program. A display device (such as a monitor) 70 is electrically connected to the computer 10 for displaying information and data associated with the software, e.g., by means of a graphical user interface. A keyboard 60 is also connected to the computer. As an alternative to using the keyboard 60 for input, a mouse can be used for moving a selector on the display device 70 and for selecting an item on which the selector overlays, as is well known in the art. Input devices 50 such as compact disks (CD) and DVDs can be inserted into the computer 10 for inputting the software programs and other information to the computer 10 and the processor 20. Still further, the computer 10 can be programmed, as is well known in the art, for storing the software program internally. In addition, media files (such as images, music and videos) can be transferred to the memory 30 of the computer 10 by means of input devices 50 such as memory cards, thumb drives, CDs and DVDs, or by connecting a capture device (such as camera, cell phone, video recorder) directly to the computer 10 as an input device. The computer 10 can have a network connection, such as a telephone line or wireless connection 80, to an external network, such as a local area network or the Internet. Software programs and media files can be transferred to the computer from other computers or the Internet through the network connection.

It should also be noted that the present invention can be implemented in a combination of software or hardware and is not limited to devices which are physically connected or located within the same physical location. One or more of the devices illustrated in FIG. 1 can be located remotely and can be connected via a network. One or more of the devices can be connected wirelessly, such as by a radio-frequency link, either directly or via a network.

Figure 2:
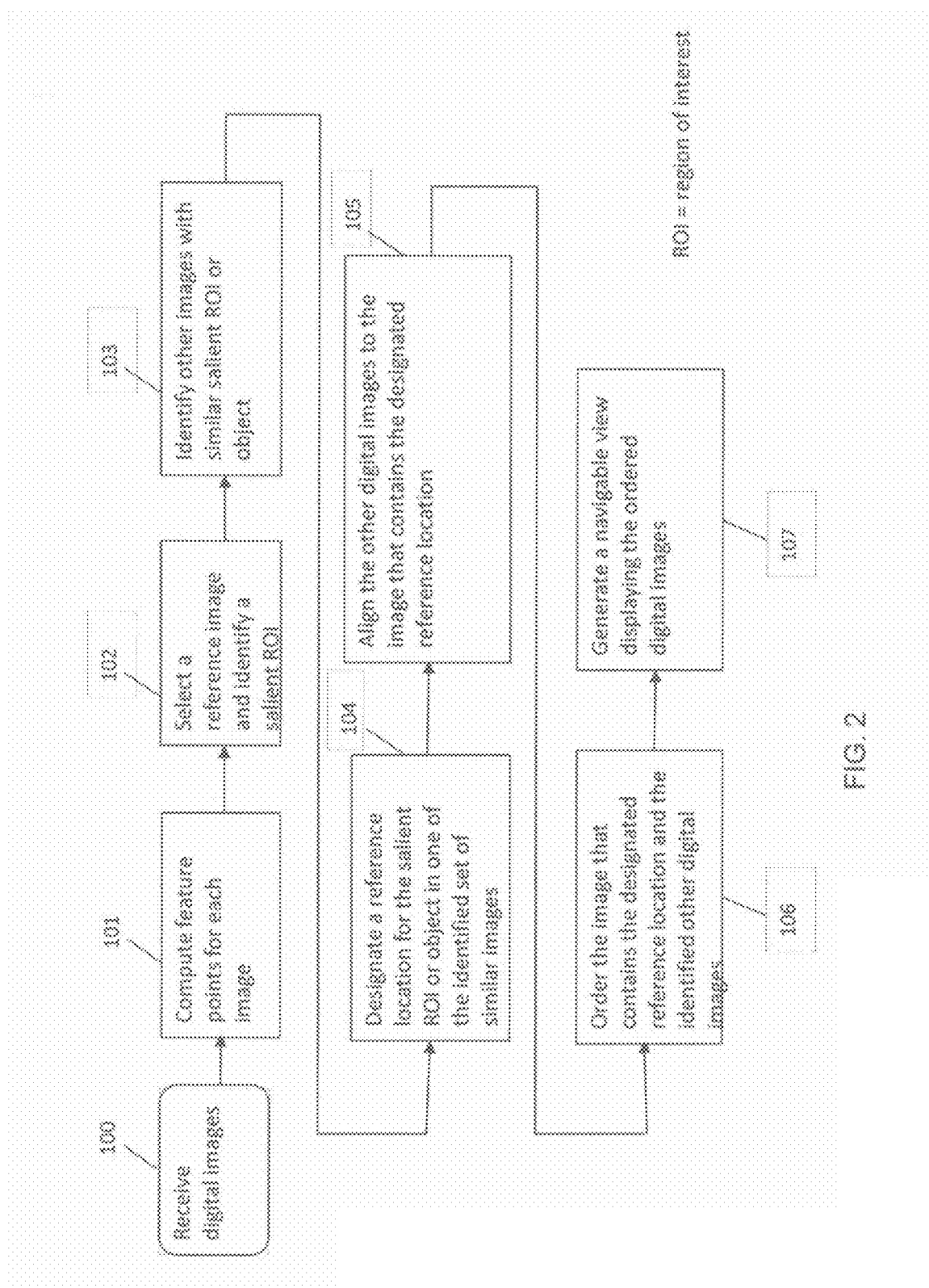
FIG. 2 describes a flowchart of a method according to an embodiment of the present invention.

Referring to FIG. 2, a set of digital images is received in step 100. Recurring salient ROI or object is identified by matching keypoints in reference and target images in the set of digital images. This is enabled in step 101 by first computing feature points such as SIFT keypoints for each image in the image set. Then a recurring salient ROI or object is identified in a reference image selected from the digital image set in step 102. In step 103, a scene matching algorithm is applied to identify all the other images with similar salient ROI or object as identified earlier. Next a reference location of a salient ROI or object is designated in one of the identified set of similar images 104. Then the corresponding ROI or object of each of the identified images is aligned (e.g., rotated, shifted, cropped) with respect to the reference location of the salient ROI or object 105. After the alignment, the set of similar images are ordered in a chronological way (or in other ways, such as by number of people or by the age of person) 106. Finally, presentation or navigable views are created using the ordered set of images 107. The details of the various steps are described below.

The preferred features that are extracted from the image are the SIFT features, described by Lowe in International Journal of Computer Vision, Vol. 60, No 2, 2004. This method uses keypoint selection based on maxima and minima of difference-of-Gaussians and describes these keypoints using gradient magnitude and orientation in that region 101. The keypoints typically represent interesting edges and corners in an image. Lowe also describes methods for using SIFT to match patterns even when other parts of the image change and there is change in scale and orientation of the pattern. An alternative to SIFT that also can match interest points in images where the scale may differ is SURF (Speeded up Robust Features) by Bay et al in 9th ECCV, 2006. This is a faster method based on sums of 2D Haar wavelet responses that makes an efficient use of integral images. Other features can include HOG (Histogram of Oriented Gradients) descriptors and GLOH (Gradient Location and Orientation Histogram) descriptors. These descriptors area described in the reference paper by Krystian Mikolajczyk and Cordelia Schmid in "A performance evaluation of local descriptors", IEEE Transactions on Pattern Analysis and Machine Intelligence, 10, 27, pp 1615-1630, 2005.

Figure 3:
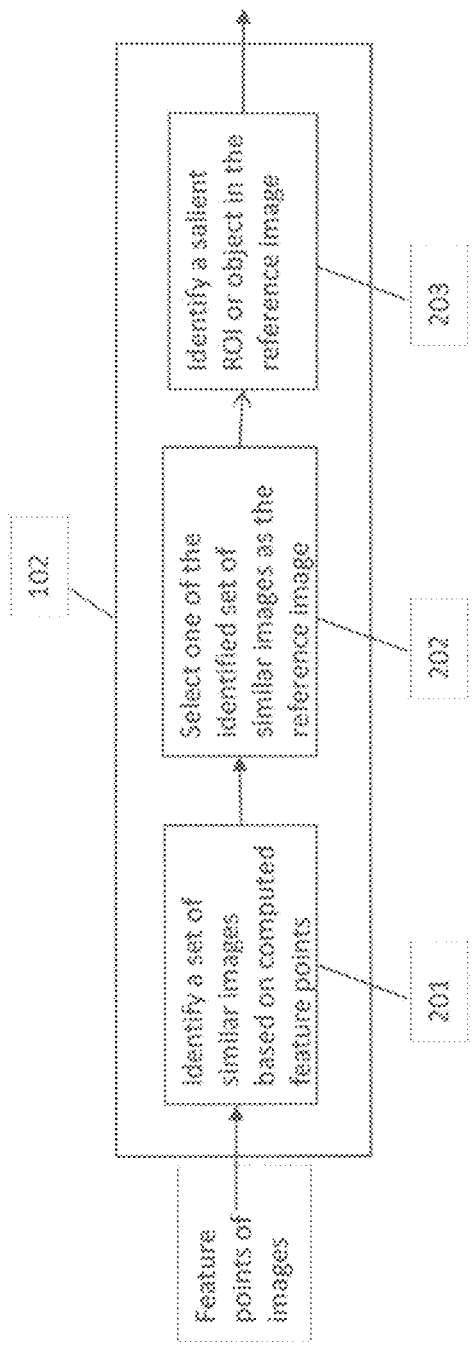
FIG. 3 describes a flowchart of block 102 of FIG. 2.

The selection of a reference image and the identification of a salient ROI or object in the reference image in step 102 can be provided by the user. Note that the salient region of interest or object will often be a unique object in the image. However, the selection of a reference image can be done automatically as shown in FIG. 3. Referring to FIG. 3, by using the computed feature points, a set of images can be identified to be similar to the reference image using step 201. An example of similarity measure is histogram intersection, which computes the color histograms difference between two images. Specifically this step can be accomplished by using a well-known clustering algorithm such as K-means or ISODATA (see reference below). Then a reference image is selected from one of the identified set of similar images in step 202. This can be accomplished by using a number of image-based criteria such as image quality, image composition, and image aesthetics to select the best image from the identified set of similar images. Finally the identification of a salient ROI or object can be provided by the user in step 203.

Figure 4:
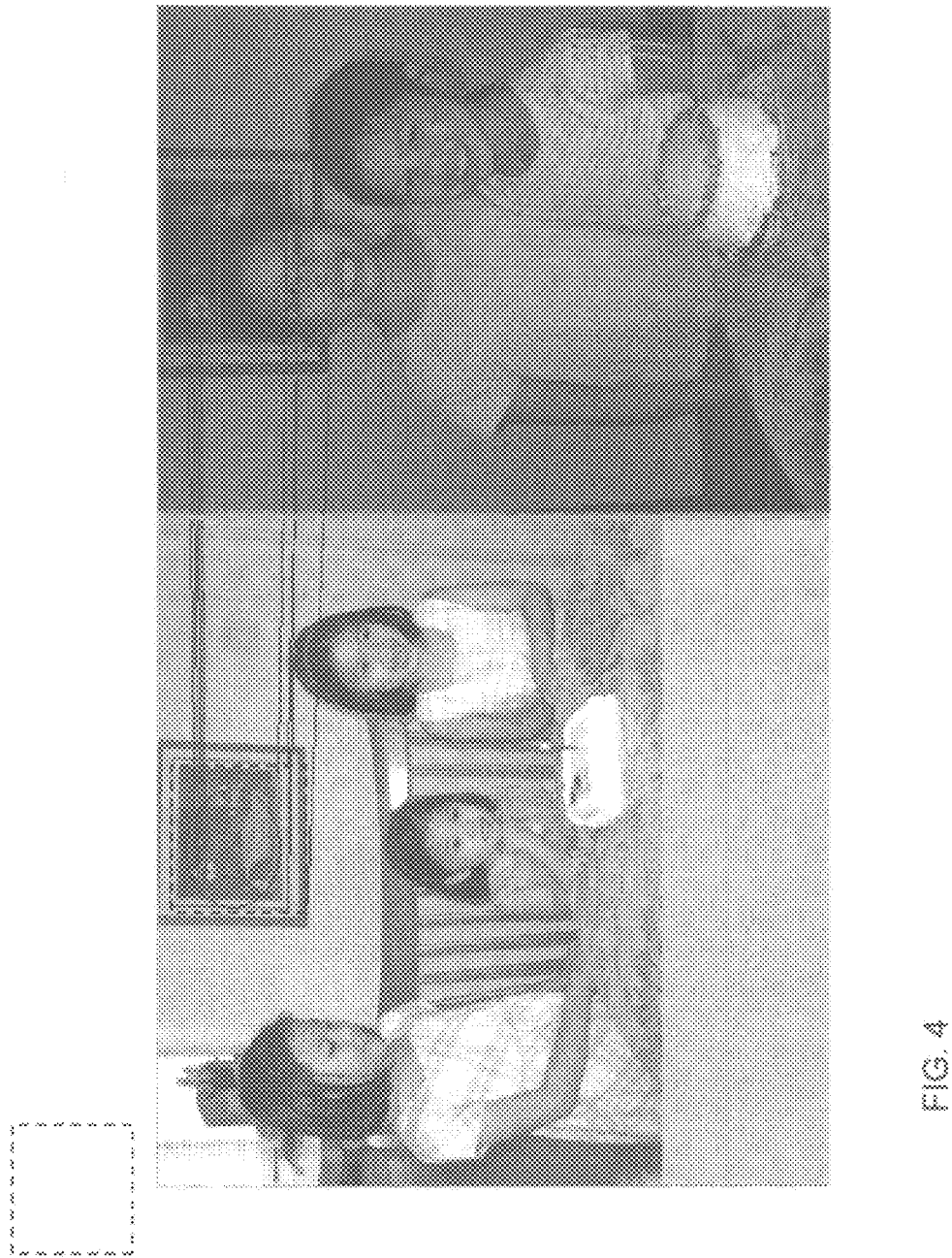
FIG. 4 shows an example of matching of SIFT keypoints of a same object appearing in two different images according to an embodiment of the present invention.

Matching SIFT features using the method described by Lowe produces a set of matched keypoints between the reference and target images. However, in cluttered scenes such as consumer images, false matches are quite common. False matches occur when points matched do not correspond to the same objects in the two scenes. To remove false matches, a number of constraints are imposed on the matched points in step 103. Specifically the method for removing the false matches is described in the patent by Gallagher et al, "Grouping images by location," U.S. Pat. No. 8,150,098, Apr. 3, 2012. As the first step, the matched points are clustered into spatial groups in each image based on the 2D Euclidean distance between the points. In the preferred embodiment, the ISODATA clustering algorithm is used. Fast implementations of this algorithm are available (see N. Memarsadeghi et al in *International Journal of Computational Geometry and Applications*, 2006). Outlier points and clusters with less than a certain number of points (e.g. 5) are eliminated. The remaining clustered keypoints are then passed through a filter that applies a number of constraints aimed at removing false matches. Since keypoints on the same object are spatially constrained to the region occupied by the object, it is expected that clusters in the reference image will correspond to cluster(s) in the target image for true matches. A correlation score is determined for each cluster in the reference image which is computed as the proportion of points in this cluster that match points in the cluster in the target image that has the strongest match (i.e. largest number of points matched with this cluster). Clusters that have correlation scores below a threshold (e.g. 0.5) are eliminated. The next constraint ensures that the global trajectory of points from the reference to the target is consistent i.e. all objects in the scene move in the same general direction. For all remaining points in the reference image, an average direction is computed for the trajectory of the points between the reference and target images. Points that deviate by more than a certain standard deviation ($\alpha$) of this average direction (e.g. 1.5 $\alpha$) are eliminated. Next, the centroid of each cluster in the reference image is computed and points that fall outside a certain standard deviation of this centroid are eliminated. This constraint eliminates spatially outlier points within a cluster. If there are keypoints that remain after the filtering process, this indicates a match between the reference and target image. The larger the number of keypoints left, the more reliable the match, so the likelihood of match is proportional to the number of matching keypoints remaining. An example of two images with matching keypoints is depicted in FIG. 4. In this case, the picture hung on the wall is the same between the two images and hence keypoints are shown to match well despite the partial occlusion of the picture in one of the images.

Next a reference location of a salient ROI or object is designated in one of the identified set of similar images in step 104. This can be done interactively by the user via a graphical user interface. For example, a reference location of the ROI can be the location of the picture on the wall as shown in FIG. 4.

In the step 105, the corresponding ROI or object of each of the identified images is aligned to the reference location of the salient ROI or object as designated in step 104. The type of alignment can involve various geometric image transformations including but not limited to rotation, shifting, scaling, zooming, cropping, perspective transformation, or combination thereof. This is achieved by determining the pixel coordinates of the keypoints of the matched ROI or object within an image. For example, a bounding box can be determined by just covering all the keypoints of the reference ROI in the reference image. Note that actual coordinates of the bounding box should be normalized by the resolution (i.e., width and height) of the image so that matching can be achieved independent of the resolution and aspect ratio of the images. This reference bounding box can then be used to define the reference coordinates. Referring to FIG. 4, an example reference bounding box is indicated as a dashed white box on the left reference image. This process is repeated for all the matched images in the image collection. Finally, all the matched images are geometrically transformed by aligning the respective bounding boxes to the reference bounding box. In the case of FIG. 4, such alignment will not be necessary as the locations of the two bounding boxes are quite aligned. Another type of alignment includes photometrically aligning the detected images to the reference image using digital image processing operations such as color balance, tone scale adjustment, brightness enhancement, contrast enhancement, noise adjustment, or combinations thereof. Yet another type of alignment includes applying filters corresponding to special effects to the identified images or the reference image.

Figure 5A:
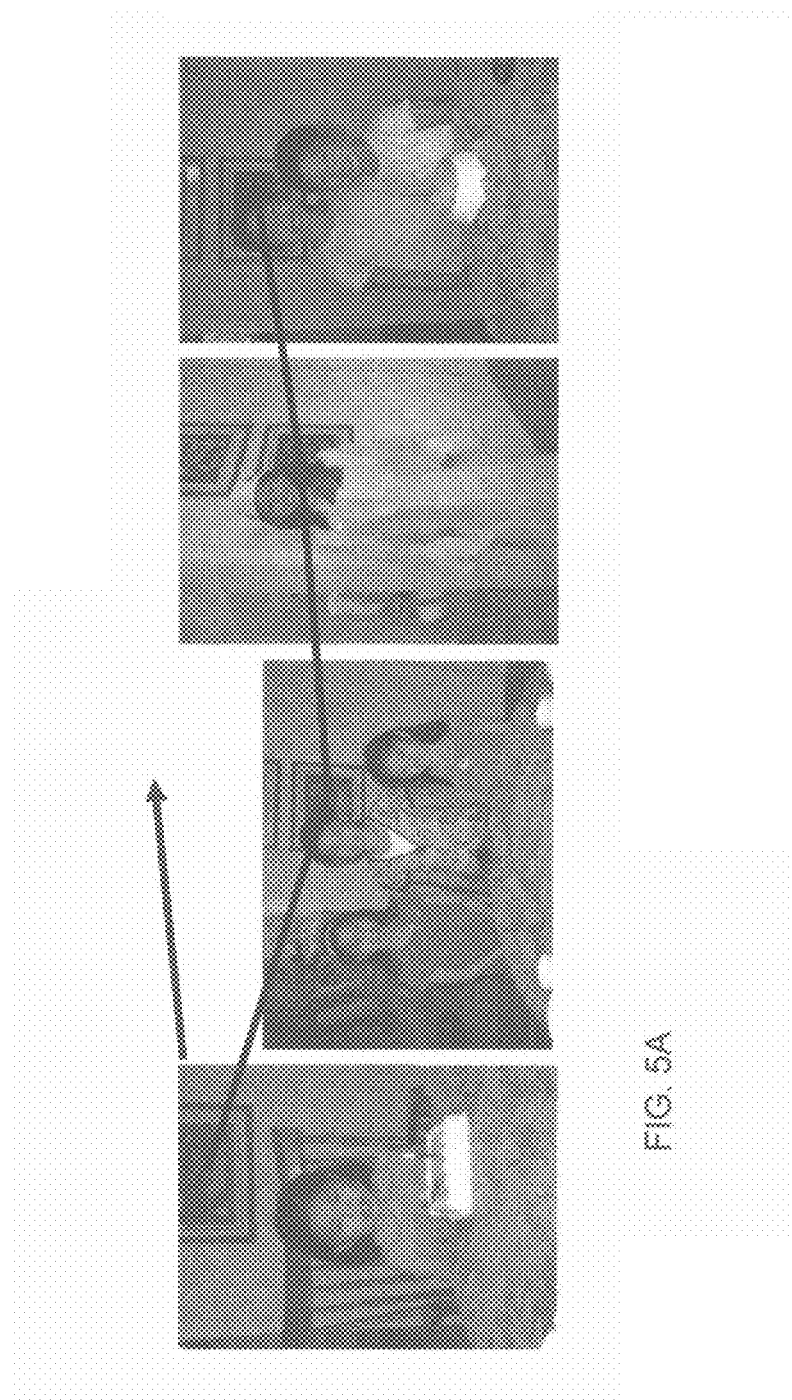
FIG. 5A shows images order in chronological order according to an embodiment of the present invention.
Figure 5B:
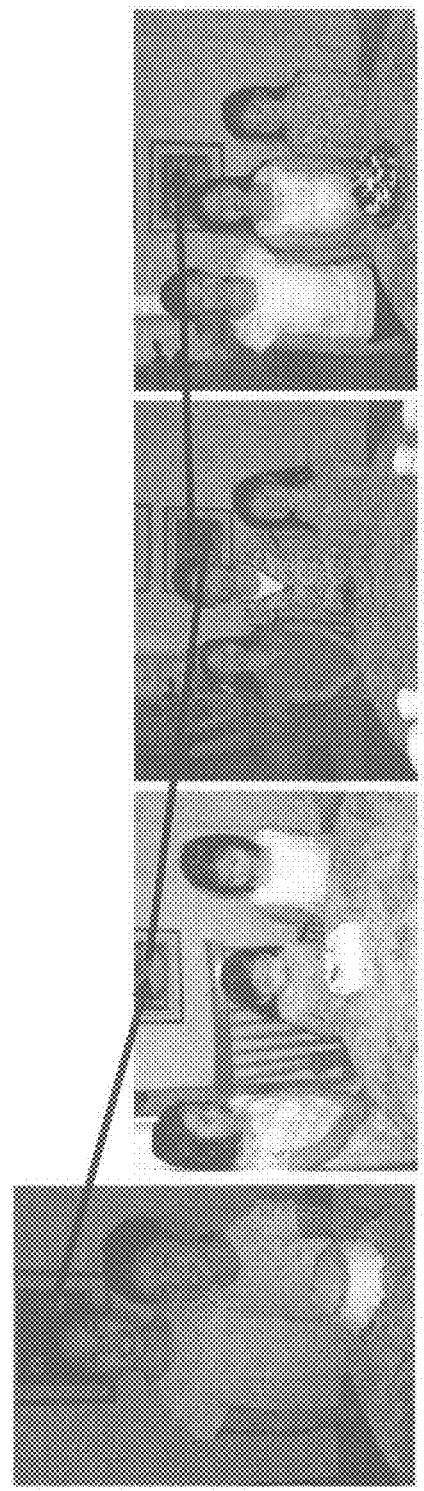
FIG. 5B shows images ordered by number of people according to an embodiment of the present invention.
Figure 5C:
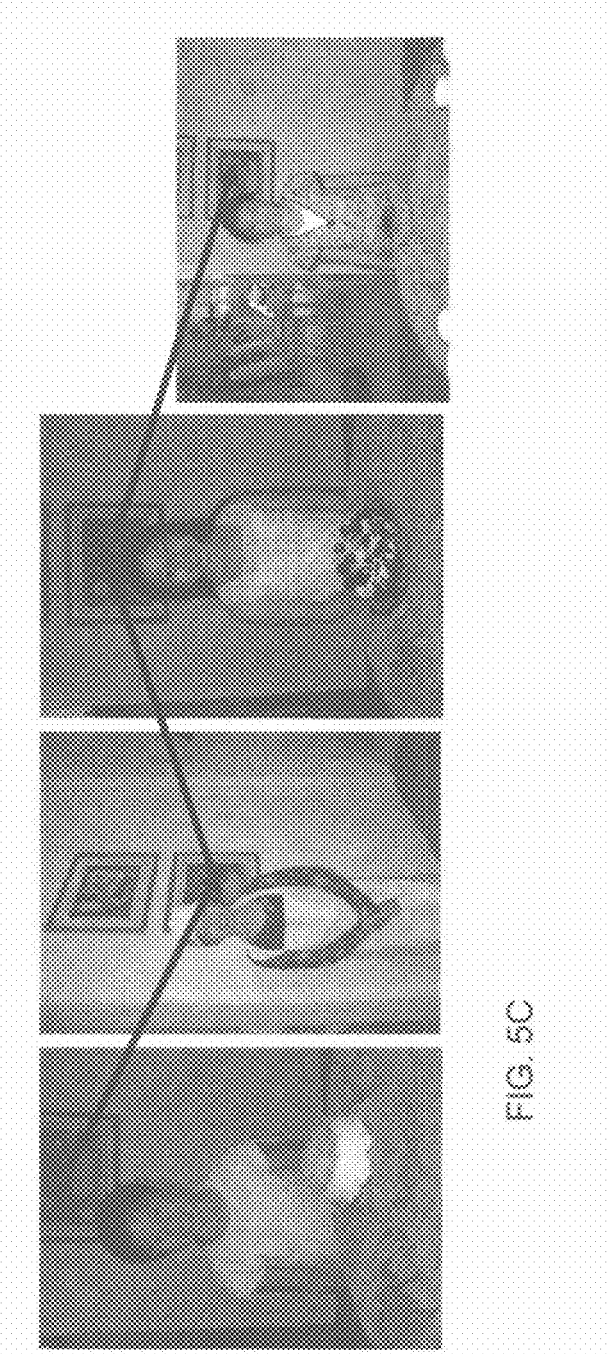
FIG. 5C shows images with a single person ordered by age according to an embodiment of the present invention.

After the alignment, the detected images are ordered in a chronological way (or in other ways, such as by number of people or by the age of person) in step 106. FIG. 5 illustrates a number of scenarios but the invention is not limited by these depicted here. FIG. 5A illustrates an ordering scenario by captured time. To order the matched images in chronological time order, the captured date/time information extracted from the header of the images (e.g., EXIF header from a JPEG image) can be used. In FIG. 5B, the ordering is done by the number of the people presented in the image. This can be achieved by using a face detection algorithm such as the face detector described in "Probabilistic Modeling of Local Appearance and Spatial Relationships for Object Recognition", H. Schneiderman and T. Kanade, Proc. of CVPR'98, pp. 45-51. FIG. 5C illustrates an ordering scenario by age. This can be accomplished by using a combination of face detection and clustering algorithms. A face detection algorithm is applied to first determine the location of detected faces. Then facial features can be extracted, for example, using an Active Shape Model as described by T. F. Cootes, C. J. Taylor, D. H. Cooper, and J. Graham in the paper "Active shape models—their training and application," *Computer Vision and Image Understanding* (61): 38-59, 1995, to extract facial feature points. These facial feature points can then be used to determine clusters with similar faces (i.e., faces having similar facial feature points). The age of the face can then be determined by user profile data if available or estimated by an age and gender algorithms such as those described in "Support vector machines for visual gender classification" by M.-H. Yang and B. Moghaddam, Proc. ICPR, 2000, and "Learning from facial aging patterns for automatic age estimation" by X. Geng, Z.-H. Zhou, Y. Zhang, G. Li, and H. Dai, ACM MULTIMEDIA 2006. FIG. 5D illustrates an ordering scenario by images with a same person in chronological order. This again can be achieved by using face detection and clustering to identify the images of the same person, followed by extracting the date/time information from the image header to determine the chronology. It is noted that other semantic content of object other than people can be used in this invention. For example, frequent recurring objects such as cars, pets, toys, plants, can be used for various ordering scenarios not limited to those described here.

Figure 6:
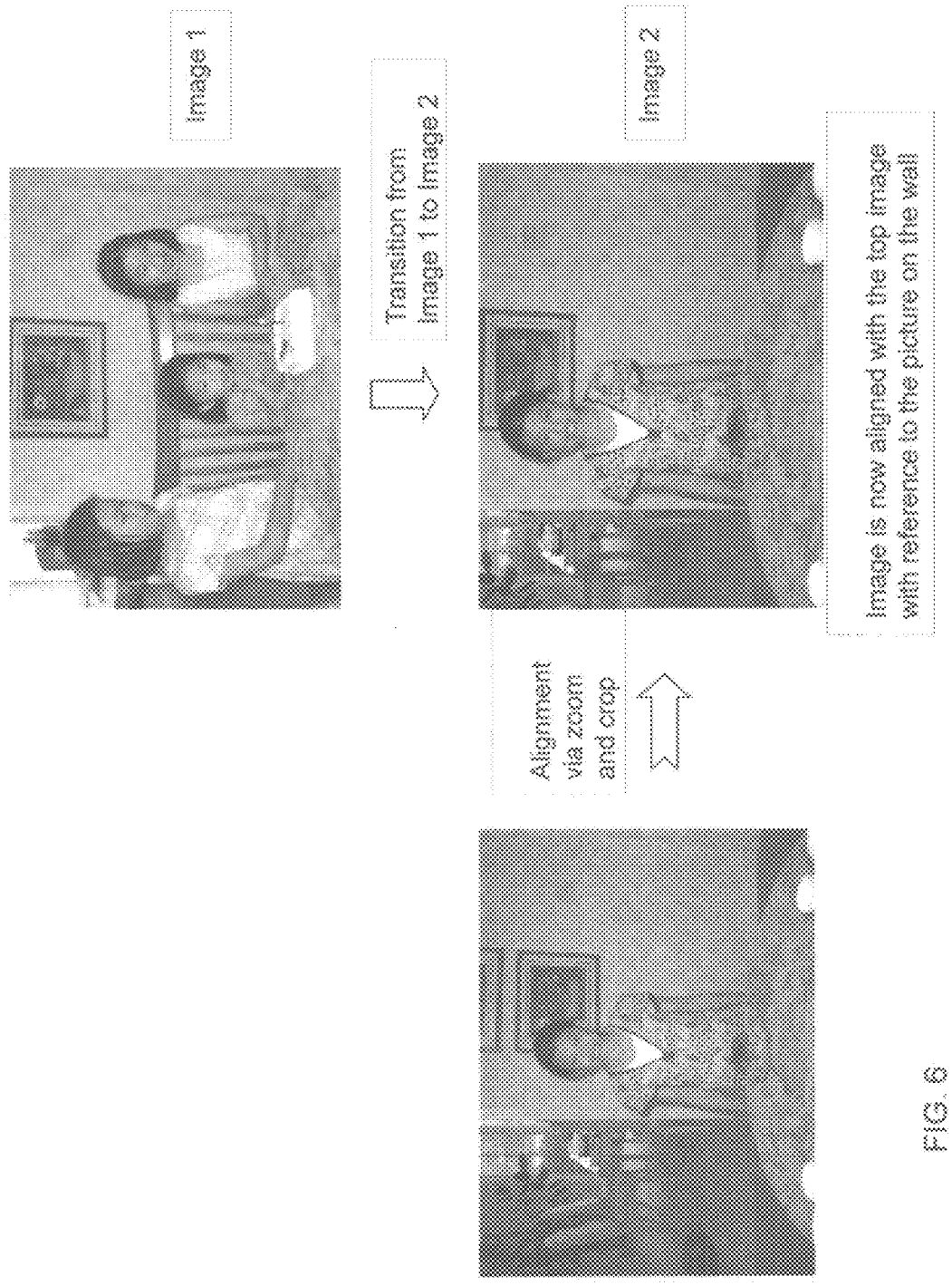
FIG. 6 shows an example of alignment via zoom and crop according to an embodiment of the present invention.

Finally, presentation or navigable views are created using the ordered set of images in step 107. For example, the white arrows in FIG. 5 illustrate the order in which the image is presented or navigated with similar background picture in the various scenarios described above. FIG. 6 provides a more detailed illustration of the overall application. Referring to FIG. 6, the top image is the reference image, where the reference object is the picture on the wall. The lower image on the left is one of the original images detected to have the same picture on the wall. After the alignment step 105 (by zoom and crop operations in this case), the lower image on right (Image 2) is much more aligned with the reference image on the top (Image 1) with respect to the picture on the wall. When these two images are used in a slideshow in a consecutive order (i.e, Image 1 followed by Image 2), the resulting presentation will be more pleasing with similar background appears to be stationary or less distracting when transitioning from one image to another. In addition, various transition effect such as fade and wipe can be added to further enhance the overall presentation.

Another embodiment of multimedia presentation and navigation utilizes identified recurring stationary objects for panoramic stitching and virtual environment creation and extracted non-stationary foreground objects for placement in the created virtual environments. The extracted foreground objects can be ordered and organized by temporal and spatial criterion such as chronologies, clusters, and relative physical positions, age of object or person.

U.S. Pat. No. 8,401,292 titled "Identifying high saliency regions in digital images," by Minwoo Park, Alexander Loui, and Mrityunjay Kumar is incorporated by reference to describe automated scene segmentation and object extraction techniques. In brief, the '292 patent teaches a method for identifying high saliency regions in a digital image by automatically analyze the digital image to segment it into a plurality of segmented regions, where each segmented region including a set of image pixel and being bounded by a segment boundary. A saliency value for each segmented region is determined by:
a. determining a surround region including a set of image pixels surrounding the segmented region, wherein the surround region has an outer boundary and an inner boundary defined by the segment boundary;
b. analyzing the image pixels in the segmented region to determine one or more segmented region attributes;
c. analyzing the image pixels in the surround region to determine one or more corresponding surround region attributes; and
d. determining a region saliency value responsive to differences between the one or more segmented region attributes and the corresponding surround region attributes.

Then neighboring segmented regions that share a common boundary are merged in response to determining that one or more specified merging criteria are satisfied, wherein the specified merging criteria include a criterion that the saliency of the merged segmented region be higher than the saliency of neighboring segmented regions. Finally, one or more of the segmented regions having the highest region saliency values are designated to be high saliency regions. This approach has the advantage that salient objects composed of several statistically inhomogeneous regions can be detected as a whole. It has the additional advantage that it can efficiently detect both large and small salient regions.

Furthermore, the various created virtual environments can be presented as a series of concentric bands or spheres with an "observer" in the center having independent control of scenes and objects. For example, the user would use camera monitored gestures, a pointing device, or touch screen to pan bands left or right, move through bands by going forward and back. A selected "background band" would be a contiguous or series of reconstructed scenes with a "foreground band" populated with scene related extracted objects. Steps 101 to 103 of FIG. 2 can be used to identify the background scene for reconstruction. The scene reconstruction can be achieved by any existing technique such as energy minimization via graph cuts. One such method is described in a paper by V. Kolmogorow and Zabih entitled "Multi-camera scene reconstruction via graph cuts" (European Conference on Computer Vision, May 2002).

There are four primary categories of image object types within a typical scene including foreground, background, stationary, and movable. This would allow a user to navigate through an image collection in a more natural way by providing more contiguous indoor and outdoor background environments with stationary or fixed objects like furnished rooms, walls, floors, wall art, flowering gardens, natural settings, buildings, cityscapes, and the like. Related mobile foreground objects like people, vehicles, toys, animals, are extracted and allowed to move independently of the related backgrounds. Using recurring stationary objects as key points provides the ability to use multiple background scenes to "fill in" any image data "holes" created by extracted objects.

Mobile foreground objects can also be modified to include simple animations such as with extracted images of people by providing limbs that move and bend at knee and elbow joints, or with images of automobiles that move laterally left or right consistent with the direction that the car is pointed, the wheels can also be independently extracted and rotated to further enhance the illusion of vehicle motion. When a front or back image of the car is visible the car can be made to look as though it was moving by zooming in or out to give the illusion of motion. These simple animations can be manually created by the user with standard image animations tools such as GIMP the GNU Image Manipulation Program or Adobe Edge Animate CC. Alternatively, with semantically identified and extracted objects, animation options can be automatically created and presented to the user such as wave, walk left, walk right, dance, and so on. In addition, extracted objects can be automatically animated when they enter the user's field of view, when the user is navigated the virtual environment.

As a user zooms and pans through the concentric bands or spheres, foreground and background content can be moved independently so that the user can independently select background environments and foreground objects. This would allow a user to create and experience virtual environments or use this same technique to easily create populated scenes suitable for printing and sharing.

The invention has been described in detail with particular reference to certain preferred embodiments thereof, but it will be understood that variations and modifications can be effected within the spirit and scope of the invention.

The invention claimed is:
1. A method for creating navigable views using a plurality of ordered images, comprising:
  receiving a plurality of digital images each including depictions of faces and at least one stationary background object distinct from the depictions of faces;
  using a processor to compute a set of feature points for each of the plurality of digital images;
  selecting one of the plurality of digital images as a reference image;
  identifying a salient region of interest in the reference image;

using the processor to identify a set of digital images in the plurality of digital images each including a region of interest the same as the salient region of interest in the reference image using the set of feature points computed for the plurality of digital images;

designating a reference location for the salient region of interest in the reference image or in one of the set of the plurality of digital images;

using the processor to align the reference image and each of the set of the plurality of digital images with respect to the designated reference location;

ordering the reference image and each of the set of the plurality of digital images based at least in part on a time of capture of the plurality of digital images; and generating a navigable view comprising displaying the reference image and performing a slideshow transition from the reference image to one of the set of the plurality of digital images, wherein the salient region of interest comprises the at least one stationary background object in the reference image.

2. The method of claim 1 wherein the feature points comprise Scale-Invariant Feature Transform (SIFT) keypoints, Speeded Up Robust Feature (SURF) keypoints, Histogram of Oriented (HOG) descriptors, or Gradient Location and Orientation Histogram (GLOH) descriptors.

3. The method of claim 1, wherein selecting one of the plurality of digital images as the reference image comprises receiving a user input as a selection of the reference image.

4. The method of claim 1, wherein selecting one of the plurality of digital images as the reference image further includes:
using the processor to identify a set of similar images in the plurality of digital images based on the computed set of feature points; and
selecting one of the identified set of similar images as the reference image.

5. The method of claim 1, wherein identifying the salient region of interest in the reference image comprises using the processor to identify the salient region of interest based on the computed set of feature points for the reference image.

6. The method of claim 1, wherein identifying the salient region of interest in the reference image comprises receiving a user input as an indication of the salient region of interest.

7. The method of claim 1, wherein aligning includes geometrically aligning the reference image and each of the set of the plurality of digital images using rotation, shifting, scaling, zooming, cropping, perspective transformation, or combinations thereof.

8. The method of claim 1, wherein aligning includes photometrically aligning the reference image and each of the set of the plurality of digital images using color balance, tone scale adjustment, brightness enhancement, contrast enhancement, noise adjustment, or combinations thereof.

9. The method of claim 1, wherein aligning further includes using the processor to apply filters corresponding to special effects to the set of the plurality of digital images or the reference image.

10. The method of claim 1, wherein the reference image and the set of the plurality of digital images are ordered in chronological order, a number of people in each of the plurality of digital images, an age of each person in each of the plurality of digital images, an identity of a person in each of the plurality of digital images, or combinations thereof.

11. The method of claim 1, wherein the navigable view comprises a slideshow presentation, a video of the ordered reference image and the set of the plurality of digital images, a panorama of the ordered reference image and the set of the plurality of digital images, an interactive presentation, an animated presentation, an interactive game, or a virtual reality environment.

12. A system for creating navigable views using a plurality of ordered images, comprising:
a memory configured to store a plurality of digital images each including depictions of faces and at least one stationary background object distinct from the depictions of faces; and
a processor configured to:
compute a set of feature points for each of the plurality of digital images;
receive a selection of one of the plurality of digital images as the reference image;
receive an identification of a salient region of interest in the reference image;
identify a set of digital images in the plurality of digital images each including a region of interest the same as the salient region of interest in the reference image using the set of feature points computed for the plurality of digital images;
designate a reference location for the salient region of interest in one of the set of the plurality of digital images;
align the reference image and each of the set of the plurality of digital images with respect to the designated reference location;
order the reference image and each of the set of the plurality of digital images based at least in part on a time of capture of the plurality of digital images;
generate a navigable view comprising displaying the reference image and performing a slideshow transition from the reference image to one of the set of the plurality of digital images; and
store the generated navigable view to the memory;
wherein the salient region of interest comprises the at least one stationary background object in the reference image.

13. The system of claim 12, wherein the feature points comprise Scale-Invariant Feature Transform (SIFT) keypoints, Speeded Up Robust Feature (SURF) keypoints, Histogram of Oriented (HOG) descriptors, or Gradient Location and Orientation Histogram (GLOH) descriptors.

14. The system of claim 12, wherein the processor is configured to receive a user input as a selection of the reference image.

15. The system of claim 12, wherein the processor is configured to:
identify a set of similar images in the plurality of digital images based on the computed set of feature points; and
select one of the set of similar images as the reference image.

16. The system of claim 12, wherein the salient region of interest in the reference image is identified based on the computed set of feature points for the reference image.

17. The system of claim 12, wherein the processor is configured to receive a user input as an identification of the salient region of interest in the reference image.

18. The system of claim 12, wherein the processor is configured to geometrically align the reference image and each of the set of the plurality of digital images using rotation, shifting, scaling, zooming, cropping, perspective transformation, or combinations thereof.

19. The system of claim 12, wherein the photometrically align the reference image and each of the set of the plurality of digital images using color balance, tone scale adjustment, brightness enhancement, contrast enhancement, noise adjustment, or combinations thereof.

20. The system of claim 12, wherein the processor is configured to apply filters corresponding to special effects to the set of the plurality of digital images or the reference image.

21. The system of claim 12, wherein the reference image and the set of the plurality of digital images are ordered in chronological order, a number of people in each of the plurality of digital images, an age of each person in each of the plurality of digital images, an identity of a person in each of the plurality of digital images, or combinations thereof.

22. The system of claim 12, wherein the navigable view comprises a slideshow presentation, a video of the ordered reference image and the set of the plurality of digital images, a panorama of the ordered reference image and the set of the plurality of digital images, an interactive presentation, an animated presentation, an interactive game, or a virtual reality environment.

* * * * *